United States Patent
Graves (10) Patent No.: US 7,624,425 B1
(45) Date of Patent: Nov. 24, 2009

(54) METHOD AND APPARATUS FOR GENERATING A SECURITY DOCUMENT FOR A FARM IN A UTILITY COMPUTING ENVIRONMENT

(75) Inventor: David Andrew Graves, Monte Sereno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 11/262,431

(22) Filed: Oct. 28, 2005

(51) Int. Cl.
*H04L 9/00* (2006.01)
*H04L 9/32* (2006.01)

(52) U.S. Cl. .............................................. 726/1; 726/2
(58) Field of Classification Search ................ 726/1–7, 726/11–12, 17–19, 26–27; 713/150, 156, 713/175
See application file for complete search history.

(56) References Cited

U.S. PATENT DOCUMENTS

| | | | |
|---|---|---|---|
| 6,427,032 B1 * | 7/2002 | Irons et al. .................. | 382/306 |
| 6,574,617 B1 * | 6/2003 | Immerman et al. ............. | 707/1 |
| 2006/0075465 A1 * | 4/2006 | Ramanathan et al. .......... | 726/1 |

* cited by examiner

Primary Examiner—Hosuk Song (57) ABSTRACT

Embodiments of the invention provide a method and an apparatus for generating a security document for a farm in a utility computing environment. In one method embodiment, the present invention accesses a farm specification in a utility computing environment (UCE) repository. In addition, information related to each device in the farm is accessed. Information criticality types and attributes are then collected for the farm, the information criticality matrix comprising information criticality types and attributes for each the device in the farm. The information criticality types and attributes are then combined with an abstract of a security plan to provide a complete farm security document.

22 Claims, 8 Drawing Sheets

METHOD AND APPARATUS FOR GENERATING A SECURITY DOCUMENT FOR A FARM IN A UTILITY COMPUTING ENVIRONMENT

TECHNICAL FIELD

The present invention generally relates to sets of IT compute resources organized into a cohesive unit within a computer network. Also known as compute farms. More specifically to a system and method for generating a security document for a farm in a utility computing environment.

BACKGROUND ART

Producing documentation on the technical controls for information systems in order to maintain compliance with governance on Information systems security (such as Sarbanes-Oxley, Gramm-Leach-Bliley, and HIPAA) is difficult, often tedious, and may be prone to error.

Moreover, the process of creating security documentation is expensive. For example, presently the security documentation is produced by hand, by professionals trained in security. Additionally, the professionals gather the security information through interviews with system designers and reviews of system design documents. These interviews take a significant amount of time for both the system designer and the security documentation professional. Both individuals are highly paid professionals, so the lengthy interview (which may take hours or even days) is very costly.

For example, initially, the system designer creates the detailed design of the application using the utility computing environment's design interface. The details of the design are stored in the utility computing environment's repository. All of this work is part of the system designer's normal work load, and these tasks are all completed prior to the interview.

During the interview, the system designer may refer to the detailed design of the application, as stored in the utility computing environment's repository. The document preparation professional drives the interview by referring to interview checklists, and by asking questions about the security mechanisms of the application. Finally, the documentation preparation professional creates a customized security plan for this particular application system and stores it in a separate security document repository. In many instances, the security plan follows a generally accepted report format, such as the national institute of standards and technology (NIST) special publication 800-18 "Guide for Developing Security Plans for Information Technology Systems".

In addition to the time consumption and expense associated with the initial interview process, each time the network configuration changes or a component is added or removed, the security plan must be updated. In most computational environments, especially environments having allocation capabilities, the network can be modified, adjusted, reduced, increased and the like a plurality of times in a week, month, quarter, or the like. Thus, deleteriously, each time the network is modified, the system designer is responsible for contacting the document preparation professional and scheduling another interview. It then becomes the document preparation professional's job to create a new customized security plan.

Thus, it becomes quite simple for the customized security plan to no longer be a valid representation of the actual network configuration.

DISCLOSURE OF THE INVENTION

Embodiments of the invention provide a method and an apparatus for generating a security document for a farm in a utility computing environment. In one method embodiment, the present invention accesses a farm specification in a utility computing environment (UCE) repository. In addition, information related to each device in the farm is accessed. Information criticality types and attributes are then collected for the farm, the information criticality matrix comprising information criticality types and attributes for each the device in the farm. The information criticality types and attributes are then combined with an abstract of a security plan to provide a complete farm security document.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

Embodiments of the present invention relate to generating a security document for a farm in a utility computing environment. In general, embodiments provide automated collection of information required to produce a Security Plan (thus contributing to compliance with legislation such as, but not limited to the Sarbanes-Oxley Act, the Gramm-Leach-Bliley Act, and the Health Insurance Portability and Accountability Act) at greatly reduced expense, and with reduction in human errors and omissions.

While the embodiments described herein may be used as a "stand-alone" system, there are significant benefits to implementing the invention as an enhancement to a Utility Computing Environment (UCE). For example, the UCE repository contains much of the information required to create a Security Plan, so automated extraction and organization of this information in the form of a Security Plan draft will greatly reduce costs. Hence, although the following discussion will explicitly describe the implementation of embodiments of the present invention in conjunction with a utility computing environment, such descriptions and discussions are for exemplary purposes only. That is, embodiments of the present invention are also able to be used without need for a utility computing environment.

In addition, integration into a Utility Computing Environment promotes improved security awareness on the part of the designers who use the UCE, and thus improved security of system designs in that environment. That is, the UCE designers will know that their work will become visible to Security Document Preparation Professionals and to upper management, via documents produced by the invention.

Moreover, integration into a Utility Computing Environment reduces duplicated effort and reduces error, since information about the application is stored once in the UC repository, then used for multiple purposes: to design the system, to deploy the system in the utility computing environment, and (when using this invention) generate security documentation for the system.

Furthermore, information systems are often changed in order to meet changing needs of the organization. This invention allows a compliance document preparation professional to keep up with the need to provide documentation on application systems, even when they are undergoing rapid change.

Numerous utility computing environments exist, one of those, for example, is the utility data center (UDC) produced by Hewlett-Packard company of Palo Alto, Calif. Although such a specific implementation will be mentioned herein, it should be understood that embodiments of the present invention are also well suited to use with various other utility computing environments. The present description begins with an overview of such an environment. The details of the security document generation for the farm in the utility computing environment (UCE) are then described in further detail.

Figure 1:
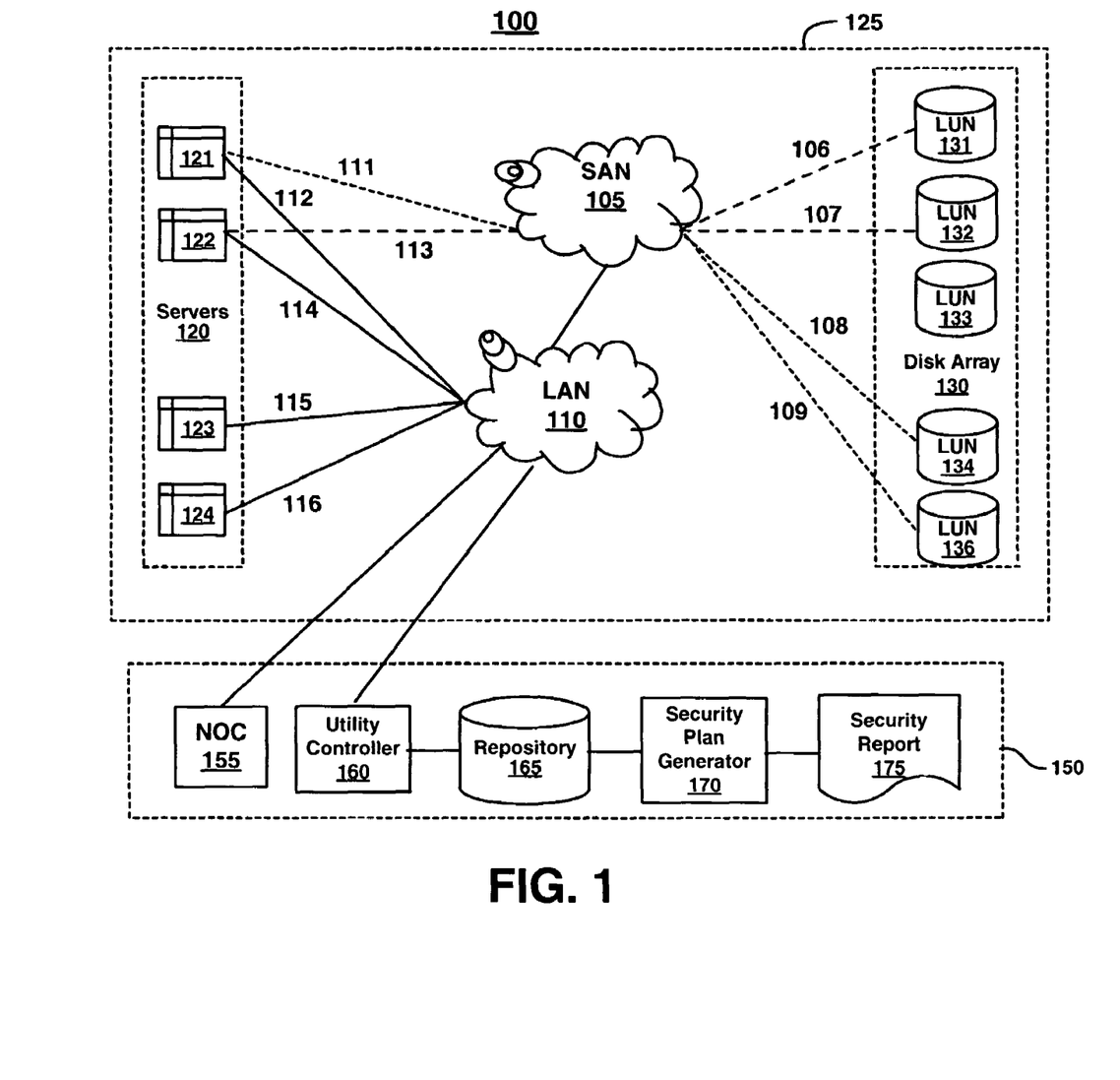
FIG. 1 is a block diagram of an exemplary network is shown in accordance with an embodiment of the present invention.

With reference now to FIG. 1, a block diagram of an exemplary network 100 is shown in accordance with one embodiment of the present invention. In general, network 100 includes a provisionable portion 125 and a utility data center portion 150. In one embodiment, provisionable portion 125 includes a local area network (LAN) 110 communicatively coupled with a storage area network 105. LAN 110 can include elements such as racks, routers, cables, switches and other elements that are well known in the art. storage area network (SAN) 105 can also include elements such as switches, routers, cables, and the like. Network 100 also includes a plurality of servers 130 coupled with both the SAN 105 and the LAN 110. Additionally, network 100 includes a plurality of LUNs within a disk array 130 coupled with SAN 105.

In one embodiment, the data center portion 150 includes the network operations center 155, a utility controller 160, a repository 165, a security plan generator 170, and a security report portion 175. As described herein, the network operation center 155 is a central management location accessible to technicians and the utility controller 160 is an automated process for managing the network. The security plan generator 170 and the optional security report 175 are described in more detail herein.

In one embodiment, repository 165 includes a network map which lists each individual network device and the attributes of the device. For example, the attributes of a device may include, but are not limited to, the make, model, type, role, and unique identifier of the device. Additionally, the network map may list each individual connection that will connect the network devices, and the attributes of those connections, such as, but not limited to, the unique identifier of the source device, the unique identifier of the destination device, the identifier of the source device's port, into which the cable is inserted, the identifier of destination device's port, into which the cable is inserted, and the type of cable used in the connection. For example, the cable may be, but is not limited to, a power cable, serial cable, Ethernet cable, fibre channel cable, or SCSI cable. In other words, the repository 165 includes a machine-readable map of the actual physical layout of the network as well as the up-to-date allocation of the network 100 resources (e.g., the provisionable portion 125).

In one embodiment, LAN 110 and SAN 105 include a number of connections 111 through 116 coupled to a number of computing devices 121-124 (e.g., servers 120). Typically, the servers 121-124 are connected with the LAN 110 or SAN 105 using cables or the like. However, wireless connections between the computing devices and LAN 110 and/or SAN 105 are also contemplated.

In another embodiment, SAN 105 includes a number of connections 106 through 109 coupled to a disk array 130 having a number of logical unit identifiers (LUNs) 131-136. Typically, the LUNs 131-136 are stored in a single location, although this may not always be the case. In this embodiment, the LUNs 131-136 are shown as being interconnected with the SAN 105 using cables or the like. However, wireless connections between the LUNs 131-136 in SAN 105 are also contemplated. In one embodiment, the connections 111-116 and 106-109 are connected to switches. In general, the switches are capable of being programmed or configured such that LAN 110 and/or SAN 105 are logically separated into a number of virtual LANs (VLANs), virtual SANs (VSANs), or farms. For purpose of the present application, in the computing industry, a farm is defined as a large number of information-systems devices. A "server farm" is a collection of a large number of computer servers. A "storage farm" is a collection of a large number of data storage devices, such as magnetic disk drives or disk arrays. For this application, however, "farm" has the additional context of being a collection of information system devices that have been provisioned in a Utility Computing Environment. The programming or configuring of these switches can be changed, thereby changing the resources allocated to the various farms. For example, by changing the configuration of switch 205, computer system 120 can be "virtually moved" from one VLAN or VSAN farm to another. The allocation and reallocation of resources between VLAN or VSAN farms is one of the valuable operations performed after the actual physical building of the network structure.

One example of a VSAN farm is shown by the dotted line in FIG. 1 wherein a server 121 is in a VSAN farm including cable 111 via SAN 105 and further including LUNs 134 and 136 and also cables 108 and 109. A second example of a VSAN is shown by the broken line in FIG. 1 wherein a server 122 is in a VSAN farm including cable 113 via SAN 105 and further including LUNs 131 and 132 and also cables 106 and 107.

In addition to computer systems and switches, LAN 110 and SAN 105 can include other types of devices such as, but not limited to, routers, load balancers, firewalls, and hubs. These other types of devices may also be programmable or configurable.

The term "configurable device" is used herein to refer to devices that can be programmed or configured. The term "configuration information" is used herein to refer to information that describes the configuration of a configurable device. In one embodiment, the computer-readable network map need not exist in the form conventionally associated with human-readable maps. Furthermore, a network map may include information such as the types of devices in the LAN and SAN and a representation of each VLAN and VSAN farm. Other information included in a network map includes, but is not limited to: the network or MAC (media access control) address for the resources of the LAN and/or SAN; the port numbers of the configurable devices; the VLAN and/or VSAN identifiers associated with each of the port numbers; the socket identifier for each cable connected to each of the resources of LAN and/or SAN; manufacturer and model numbers; and serial numbers.

Figure 2:
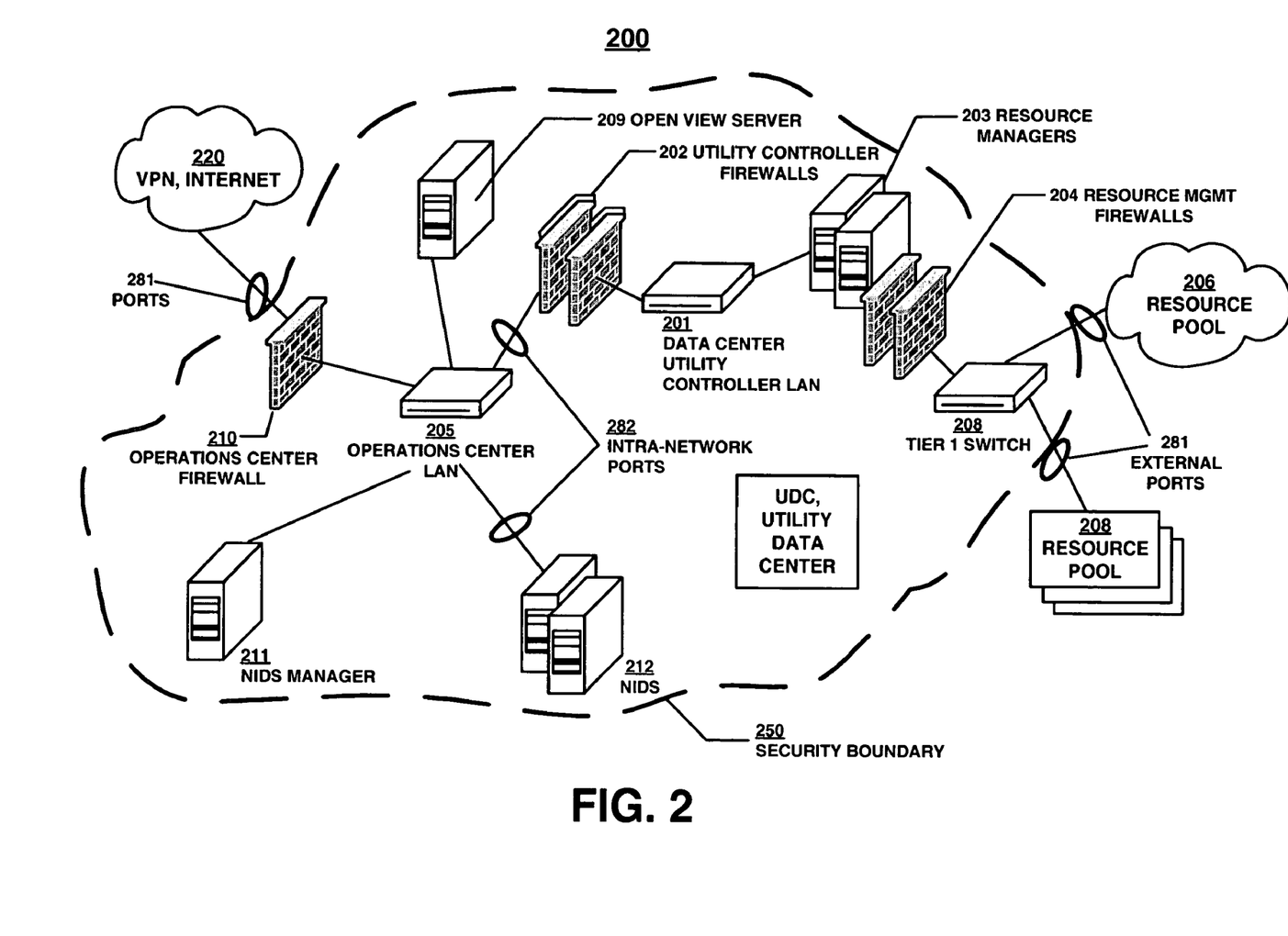
FIG. 2 is a block diagram of an exemplary typical utility computing environment in accordance with one embodiment of the present invention.

With reference now to FIG. 2, an exemplary provisionable network in which embodiments of the present invention can function. Provisional network, or utility computing environment (UCE), 200 is shown bounded by a security boundary 250. In one embodiment, security boundary 250 is a virtual boundary. Boundary 250 is shown here only to help illuminate the concepts presented herein. Typical UCE 200 comprises an operations center local area network (LAN) 205, a data center utility controller LAN 201 and resource pools 206. It is noted here that, by their very nature, UCEs are flexible in their composition, comprising any number and type of devices and systems. It is this flexibility from which they derive their usefulness. The specific architecture illustrated in FIG. 2, therefore, is not meant to limit the application of embodiments of the present invention to any particular provisionable network architecture.

Typical UCE 200, in this illustration, communicates with the outside world via the Internet 220 and virtual public networks (VPNs) in the Internet. The communications links that enable this communication are protected by firewall 210. Firewall 210 is shown to illustrate a concept and is not meant to imply any particular method or system of intrusion protection. Many types of hardware and software firewalls are well known in the art and firewall 210 may be either or both.

It is noted here that communications into and out of a provisionable network, as in any network, is accomplished through ports such as illustrated at 281. Communications between devices within a network are also conducted through ports, as alluded to at 282. It is noted that ports are not necessarily physically located at the periphery of a network but are logical end points. External ports 281 and intra-network ports 282 are shown only to help illustrate the concepts presented in embodiments of the present invention. It is also noted that virtual security boundary 250 does not exist in a physical sense. Resources included in the servers and LANs comprising utility computing environment 200 may include devices and servers located remotely from the other elements of the UCE.

As shown in FIG. 2, operations center (OC) LAN 205 comprises an internal trust domain. Included in OC LAN 205 are open view servers 209, network intrusion detection system (NIDS) 212 and NIDS manager 211. It is noted that, though NIDS 212, NIDS manager 211 are illustrated as computer-like devices, their physical existence is not limited to a particular device. Each may exist as a standalone device or implemented as software resident in a physical device or server.

The heart of the exemplary utility computing environment illustrated in FIG. 2 is the data center utility controller (UC) LAN, 201. This LAN represents another, higher, internal trust domain. UC LAN communicates through OC LAN 205 and is typically separated from it by various forms of firewalls 202. UC LAN 201 can comprise various numbers of resource managers, such as illustrated at 203. The flexibility inherent in the UCE concept can result in many combinations of resources and resource managers. Resource managers 203 are the typical interface with the various pools of resources 206, communicating with them through ports and some sort of switching network as indicated by the tier 1 switch at 208.

Resource pools 206 are limitlessly flexible, comprising any conceivable combination of data servers, computational capability, load balancing servers or any other device or capability imaginable. Because the possible varieties of resources that can be included in resource pools 206, they are separated from UC LAN 201 by firewalls 204, which, like UC firewalls 202, can be software or hardware or both, in many combinations.

It is noted that embodiments of the present invention can run in many different environments. One network management environment in which an embodiment operates serves as an end-to-end service management infrastructure and is particularly well suited to managing a provisionable network which is known as a utility data center (UDC).

Operation

As stated herein, complying with the documentation requirements for Information Security laws is expensive. For example, an enterprise may have several full-time professionals dedicated only to producing documentation for technical controls for compliance with the Sarbanes-Oxley Act. Other legislation requiring costly information systems documentation includes the Gramm-Leach-Bliley Act, and the Health Insurance Portability and Accountability Act (HIPAA).

However, embodiments described herein can be used to generate a detailed first draft for a security report (or plan) 175 for a particular application system. In one embodiment, the security plan will include security details of the computational servers 120 and other networked devices in that particular system, the inventory of information types handled by that system, the information criticality attributes of each of those information types, and the like. In one embodiment, the security plan is generated by extracting and organizing the information from the UCE repository 165. In one embodiment, the generated security report 175 can then be enhanced by a security professional to produce a final Security Plan document for the desired application system. Thus, embodiments described herein produce a more detailed document in significantly less time than traditional methods.

Figure 3:
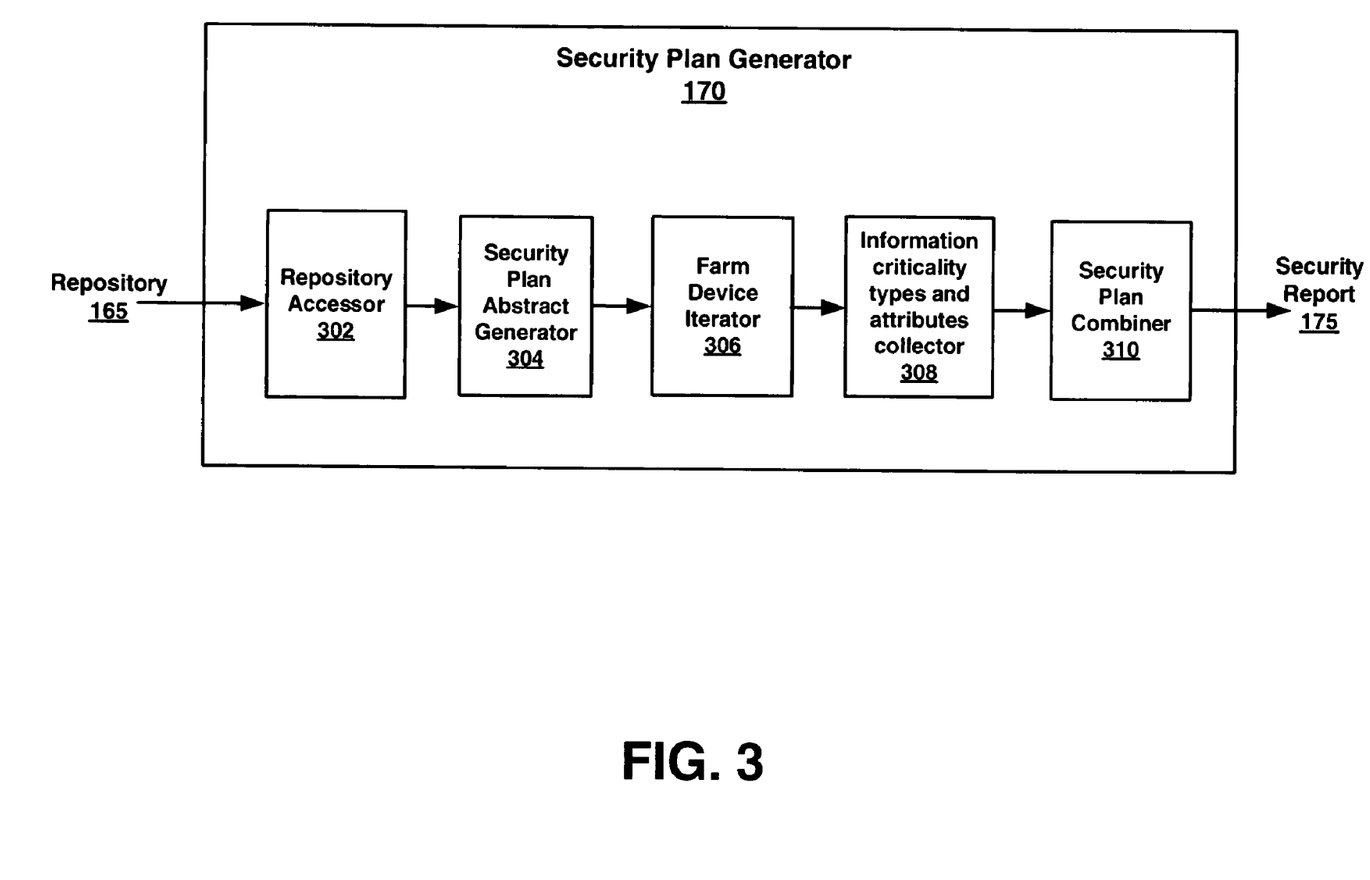
FIG. 3 is a block diagram of an exemplary security plan generator shown in accordance with an embodiment of the present invention.

With reference now to FIG. 3, a block diagram of an exemplary security plan generator 170 is shown in accordance with an embodiment of the present invention. In one embodiment, the security plan generator 170 includes a repository accessor 302 and a security plan abstract generator 304. The security plan generator 170 also includes a farm device iterator 306, an Information criticality types and attributes collector 308 and a security plan combiner 310. Although the components described herein are shown in a single location. The components may be in separate locations. Additionally, each component may be on its own computing device or a plurality of the described components may be incorporated on a single device. Furthermore, the components may be wired or wirelessly coupled. The illustration provided herein is one of a plurality of exemplary embodiment and is shown for purposes of brevity and clarity. Also, farm device iterator 306 and components thereof will be further described in detail in conjunction with the discussion of FIG. 4.

As described in detail herein, repository accessor 302 is utilized to access the UCE repository 165. The security plan abstract generator 304 generates an abstract of a security plan based on information about the device stored in the repository 165. The farm device iterator 306 processes each device in the farm. In one embodiment, farm device iterator utilizes the components described in FIGS. 4 and 5 to iterate each device in the farm 100. The Information criticality types and attributes collector 308 generates an information criticality matrix to provide a security label to each device in the farm and the overall farm structure based on the devices associated therewith. The security plan combiner 310 combines the information generated for each device in the farm into a single security report 175.

Figure 4:
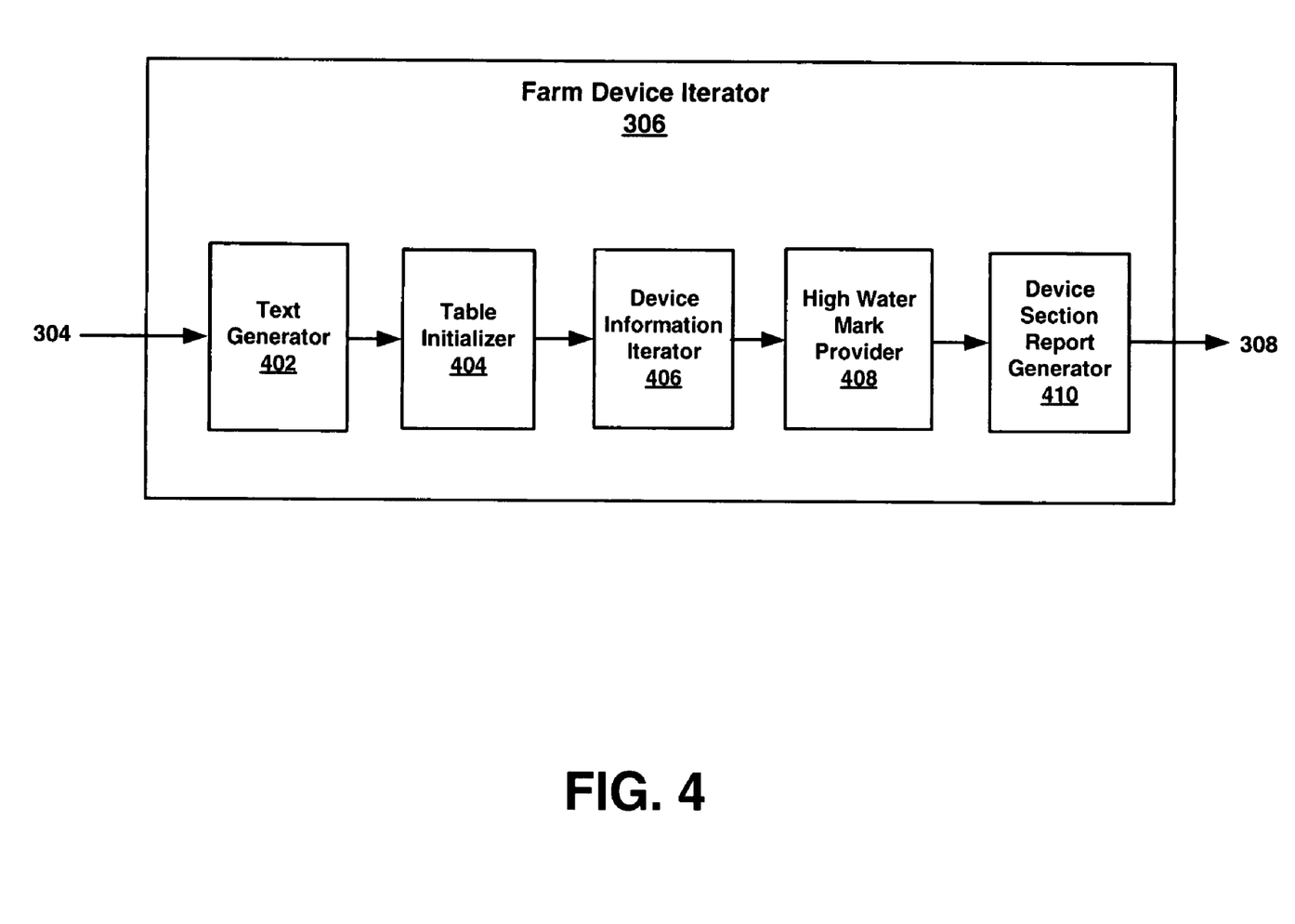
FIG. 4 is a block diagram of an exemplary farm device iterator shown in accordance with an embodiment of the present invention.

Referring now to FIG. 4, a block diagram of an exemplary farm device itterator 306 of FIG. 3 and the components thereof is shown in detail accordance with an embodiment of the present invention. In one embodiment, the farm device iterator 306 includes a text generator 402 and a table initializer 404. The farm device iterator 306 also includes a device information itterator 406, a high water mark provider 408 and a device section report generator 410. Further, device information iterator 406 and components thereof will be further described in detail in conjunction with the discussion of FIG. 5.

As described in detail herein, farm device iterator 306 utilizes a text generator 402 to generate the text associated with a device to be provided into the boilerplate text. The table intializer 404 establishes a table for each device in the farm. In one embodiment, the device information iterator 406 provides device security plan generation details at the data type. That is, each device is iterated for each data type associated with the device. The farm device iterator 306 then utilizes the device data type details generated by the device information iterator 406 to provide security plan generation details for each device. The security plan generator 170 then utilizes the security details from the device information iterator 406 to generate security plan details for the entire computational farm in a UCE.

The high water mark provider 408 provides the highest rated attributes of the device in a single column. In so doing, the highest security rating of the device is provided without having to search through each attribute and manually recognize the highest attribute ranking. The device section report generator 410 generates a section of the report for each device within the farm 100.

Figure 5:
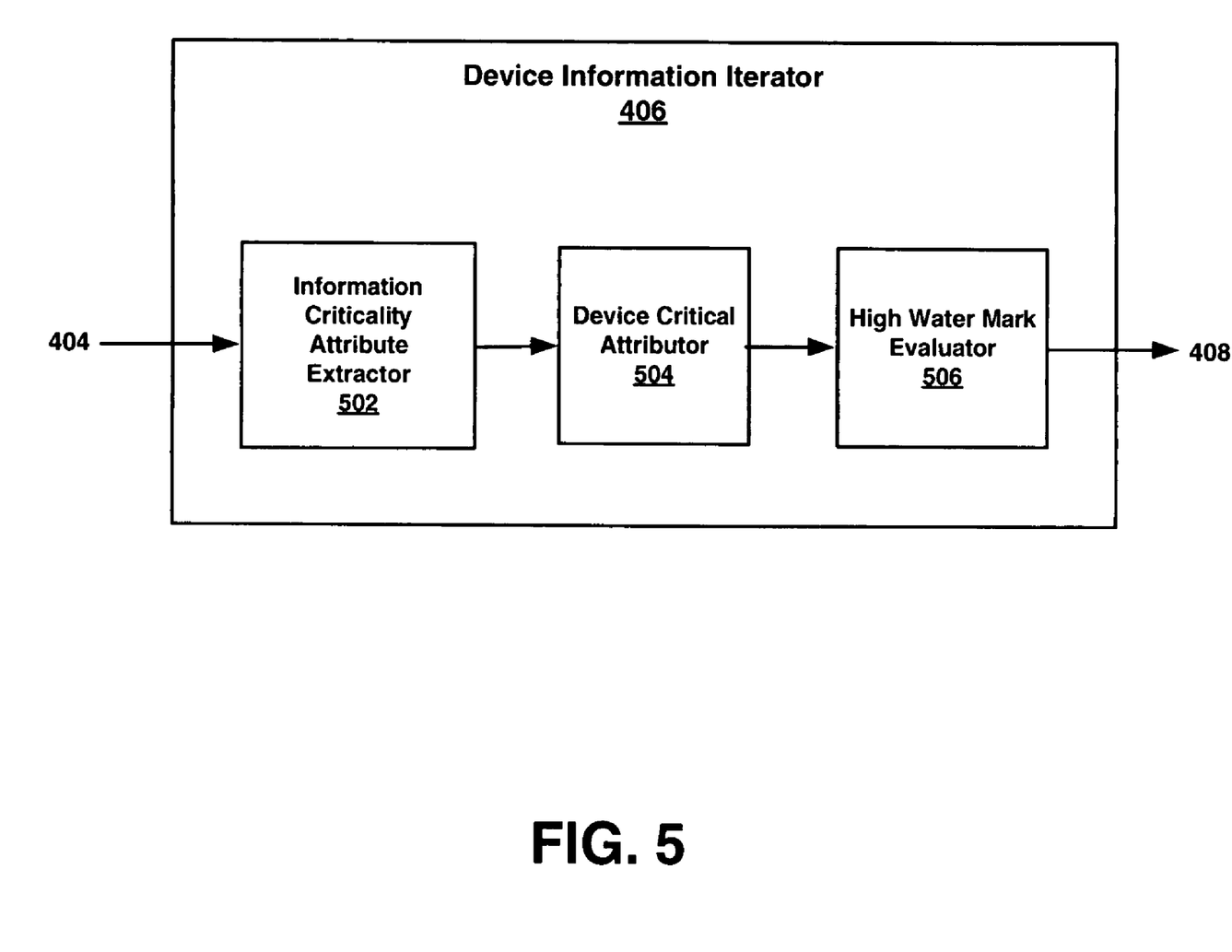
FIG. 5 is a block diagram of an exemplary device information iterator shown in accordance with an embodiment of the present invention.

With reference now to FIG. 5, a block diagram of an exemplary device information iterator 406 is shown in accordance with an embodiment of the present invention. In one embodiment, the device information iterator 406 includes a information criticality attribute extractor 502 and a device critical attributor 504. The device information iterator 406 also includes a high water mark evaluator 506. Although the components described herein are shown in a single location. The components may be in separate locations. Additionally, each component may be on its own computing device or a plurality of the described components may be incorporated on a single device. Furthermore, the components may be wired or wirelessly coupled. The illustration provided herein is one of a plurality of exemplary embodiment and is shown for purposes of brevity and clarity.

In general, as described herein, the information criticality attribute extractor 502 recognizes information criticality attributes for the device. The device critical attributor 504 generates a ranking for the device based on the criticality of the component. The high water mark evaluator 506 then runs through the list of attributes and provides a single row with the highest ranking from each column to provide easy user recognition.

Figure 6:
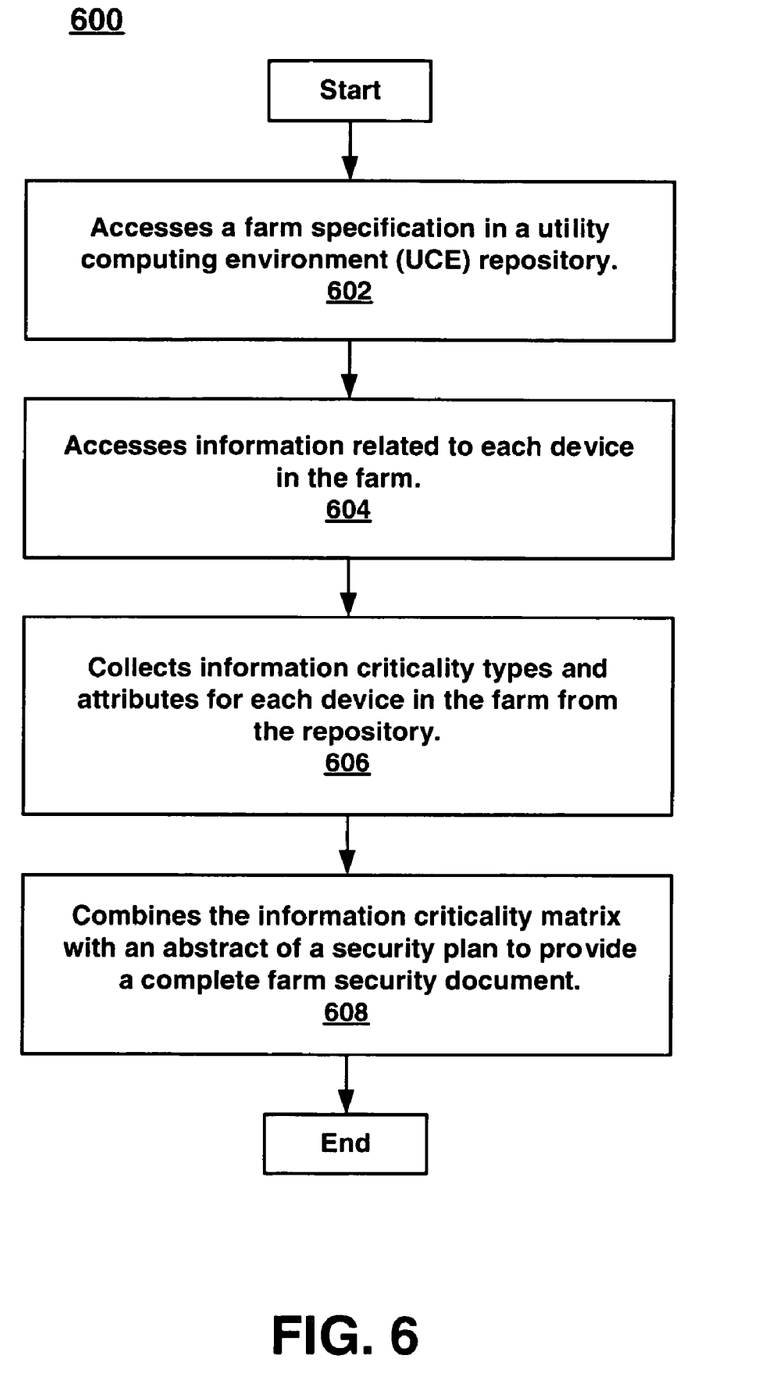
FIG. 6 is a flowchart of a method for generating a security document for a farm in a utility computing environment in accordance with one embodiment of the present invention.

Referring now to FIG. 6, a flowchart 600 of a method for generating a security document for a farm in a utility computing environment is shown in accordance with one embodiment of the present invention. In one embodiment, the system designer creates the detailed design of the infrastructure resources required by this application using the UCE's design interface. The details of the design are stored in the UCE's repository 165. In addition, sections of standardized text (also called "boilerplate") for elements of a security plan document are also included in the repository 165.

With reference now to 602 of FIG. 6 and to FIG. 1, one embodiment accesses a farm specification in a utility computing environment (UCE) repository 165. For example, sections of security plans 175 for individual components are stored in a repository 165 for use by the security plan generator 170. In one embodiment, the system designer adds information about the information types by each device in the application.

In one embodiment the information is added using an enhancement to the UCE's user interface. The information types are labeled with information criticality attributes such as (but not limited to) the confidentiality requirements for the information, the integrity requirements for the information, the availability requirements for the information, and the like.

For example, using a system design tool, a designer specifies a design for an information system. During this step, the designer indicates the information criticality attributes of each of the databases or information types that are used by each of the devices in the system. (The specification of the devices and their connections is called the "farm design"). In one embodiment, the information types are labeled with information criticality attributes such as, but not limited to, the confidentiality requirements for the information, the integrity requirements for the information, the availability requirements for the information and the like. As described herein, these information criticality attributes is also stored in the UCE repository 165.

In one embodiment, the UCE's design tool is enhanced to allow the entry of these information criticality attributes. Generally accepted security principles dictate that at a minimum, the information criticality attributes should include Confidentiality, Availability, and Integrity. However, embodiments of the system design tool may be further enhanced to include more or fewer information criticality attributes.

With reference now to 604 of FIG. 6 and to FIG. 1, one embodiment accesses information related to each device in the farm. That is, one embodiment utilizes the security plan generator 170 to access the UCE repository 165 to extract the detailed specification for the farm. In one embodiment, an abstract of the security plan for the farm is also generated by the security plan abstract generator 304 of FIG. 3. In general, the abstract includes an inventory of devices (e.g., servers 120, disk arrays 130, connections 106-116, routers, switches, and the like), a network map for the devices, and the individuals responsible for the farm. In addition to accessing the information and generating an abstract, in one embodiment an iteration is performed through each device in the farm to produce a security plan section devoted to each individual device. The iteration process is described in detail in Flowcharts 700 and 800. Hence, in embodiments in accordance with the present invention, the processes described in FIG. 7 or FIG. 8 are performed at 604 of FIG. 6.

Figure 7:
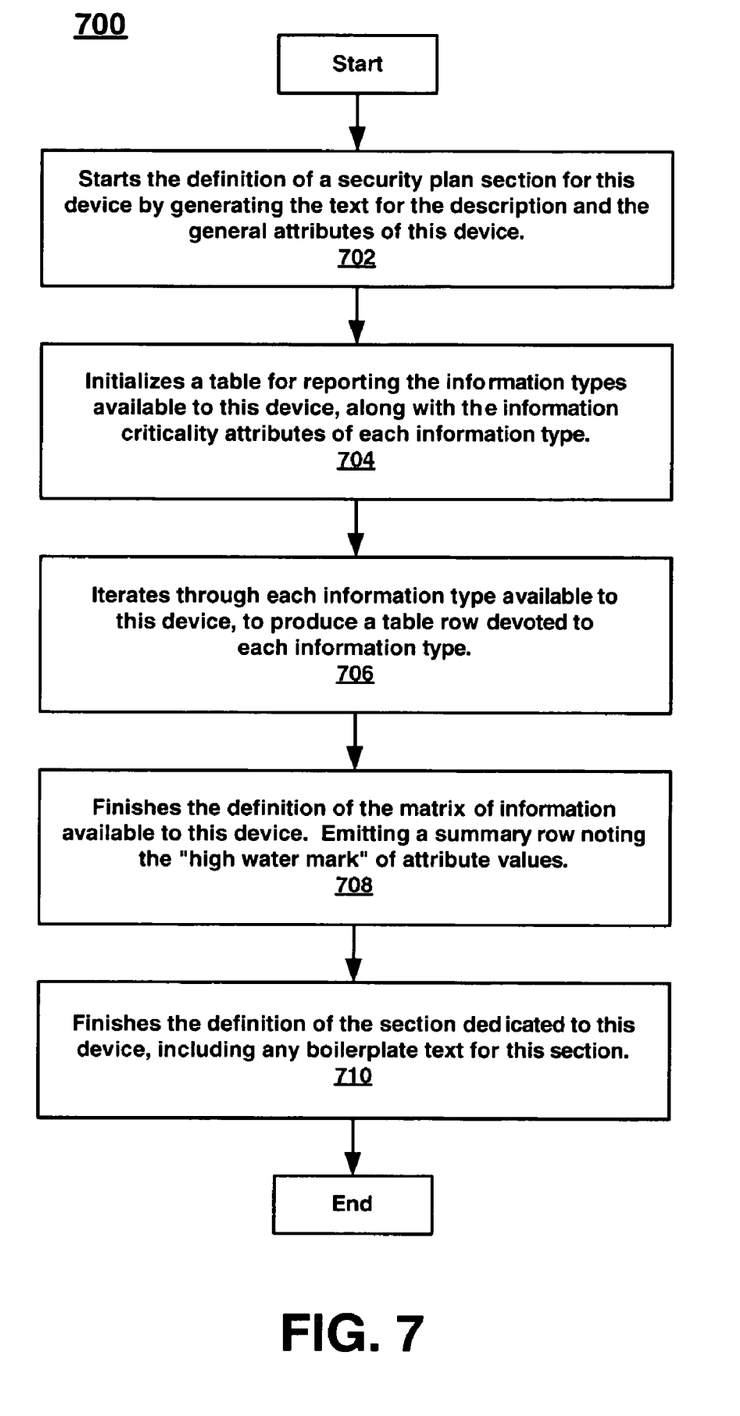
FIG. 7 is a flowchart of a method for generating a security document for a farm in a utility computing environment in accordance with one embodiment of the present invention.
Figure 8:
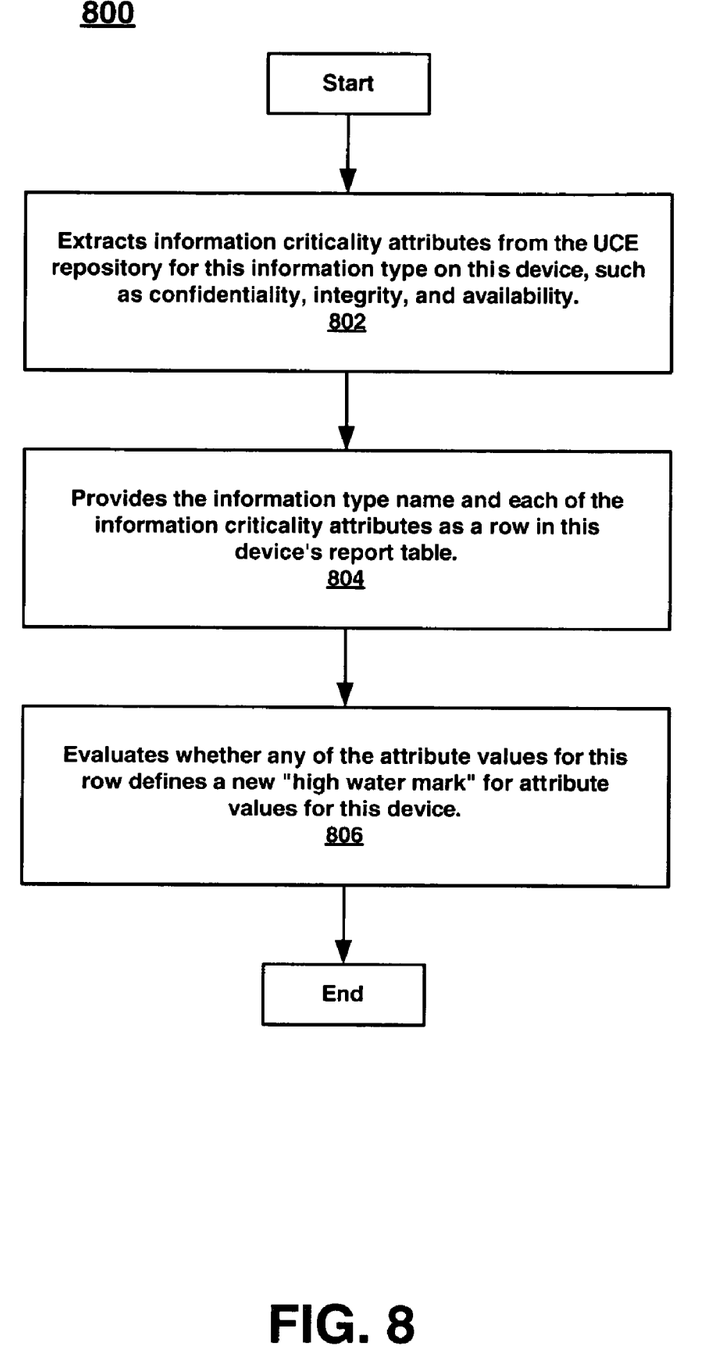
FIG. 8 is a flowchart of a method for generating a security document for a farm in a utility computing environment in accordance with one embodiment of the present invention.

With reference now to FIG. 7, a flowchart 700 of a method for generating a security document for a farm in a utility computing environment is shown in accordance with one embodiment of the present invention.

With reference now to 702 of FIG. 7 and to FIG. 1, one embodiment starts the definition of a security plan section for the device. That is, the text for the description and general attributes of the device are generated. In one embodiment, the description is automatically generated from the boilerplate text stored in the repository by the text generator 402 of FIG. 4.

For example, if the device being defined is a web server such as server 121, the boilerplate text retrieved from the repository 165 will be server boilerplate. The following is an example of one of a plurality of possible boiler plates. It is shown merely for purposes of brevity and clarity.

"Web1 is an _________ server. The Operating System is _________ version _________. This system is connected to the "_________" network subnet. Incoming network traffic is restricted to the _________ and _________ protocols. Outgoing network traffic is restricted to the _________ protocol. This system may be accessed by _________."

With reference now to 704 of FIG. 7 and to FIG. 1, one embodiment initializes a table for reporting the information types available to the specific device being evaluated. In one embodiment, the table initializer 404 initializes the table. Included in the report are the information criticality attributes of each information type associated with the device. That is, for each networked device in the system design, a list of data types that is stored and processed on the networked device are collected. In one embodiment, information types include system critical information such as customer catalog product numbers, customer credit card numbers, customer orders, customer history, accounts receivable and the like.

With reference now to 706 of FIG. 7 and to FIG. 1, one embodiment iterates though each information type available to the device, to produce a table row devoted to each information type. That is, for each of these data types, a list of associated information criticality attributes (as indicated by the UCE's repository) is collected. In one embodiment, the information is collected by the device information iterator 406. Details of the iteration process for each device are described in detail in flowchart 800. The following is an example of one of a plurality of possible table layouts. It is shown merely for purposes of brevity and clarity.

|  | Confidentiality | Integrity | Availability |
|---|---|---|---|
| Catalog product Numbers | public | high | low |

Referring now to FIG. 8, a flowchart 800 of a method for generating a security document for a farm in a utility computing environment is shown in accordance with one embodiment of the present invention.

With reference now to 802 of FIG. 8 and to FIG. 1, one embodiment extracts information criticality attributes from the UCE repository 165 for the information type on the device, such as confidentiality, integrity, availability and the like. In one embodiment, the information criticality attribute extractor 502 of FIG. 5 is utilized to perform the extraction.

Referring now to 804 of FIG. 8 and to FIG. 1, one embodiment provides the information type name and each of the information criticality attributes as a row in the specific device's report table. For example, a row of a documentation table is generated for the networked device, indicating the name of the data type and each of the attributes. In one embodiment, this is performed by the device critical attributor 504.

With reference now to 806 of FIG. 8 and to FIG. 1, one embodiment notes whether any of the attribute values for the row defines a new "high water mark" for attribute values for the device. For example, for each attribute, the value is collected in a table for further processing as described in 804, and if this value is the maximum value (also called the "high-water mark") for this attribute on the networked device it is additionally recorded or marked as the maximum value for that particular attribute. In one embodiment, the high water mark evaluator 506 is utilized to perform the action.

With reference now to 708 of FIG. 7 and to FIG. 1, one embodiment finishes the definition of the matrix of information available to the device. For example, emitting a summary row noting the "high water mark" of attribute values. That is, the final row of the table indicating the maximum values (or "high-water marks") of each of the attributes for all databases and information types associated with this networked device is generated. In other words, the high water mark provider 408 of FIG. 4 indicates the calculated information criticality for this device.

With reference now to 710 of FIG. 7 and to FIG. 1, one embodiment finishes the definition of the section dedicated to the particular device, including any boilerplate text for the section. Then, in one embodiment, a new document section is started for the next networked device. This iteration process is then repeated until all devices within the farm have been documented.

For example, if the device being defined is a web server such as an HP model DL380g3 server 121, the boilerplate text retrieved from the repository 165 will be server boilerplate and the definitions for the particular device will be automatically inserted into the boilerplate in the correct locations. In one embodiment, the automatic insertion is performed by the device section report generator 410. The following is an example of one of a plurality of possible boiler plates. It is shown merely for purposes of brevity and clarity.

> "App1 is an HP model DL3803 server. The Operation System is Linux version 3.0. The system is connected to the "appnet" network subnet. Incoming and outgoing network traffic is restricted to the BizTalk protocol. This system may be accessed by William Jones, System Administrator."

Additionally, the following is an example of one of a plurality of possible completed table layouts. It is shown merely for purposes of brevity and clarity.

App 1 - System Information Criticality Matrix

| Information Type | Information Critical Attributes | | |
|---|---|---|---|
| | Confidentiality | Integrity | Availability |
| Customer Credit Card Numbers | confidential | critical | medium |
| Customer Orders | restricted | high | high |
| Customer History | restricted | medium | medium |
| Catalog Product Numbers | public | high | low |
| High Water Mark | confidential | critical | high |

As described herein, the high water mark indicates the highest values of the Information Criticality attributes for all information types available to the App1 server.

With reference now to 606 of FIG. 6 and to FIG. 1, in one embodiment information criticality types and attributes are then collected for the farm. For example, in one embodiment the information is collected in the form of an information criticality matrix. In general, the information criticality types and attributes collector 308 of FIG. 3 provides information criticality types and attributes for each the device in the farm. In other words, once all the devices in the farm have been documented, an "Information Criticality collection" is provided for the entire application system by merging the information types found in all iterations of farm device iterator 306. In one embodiment, the information criticality collection is provided in the form of an information criticality matrix. Although a matrix example is described herein, it is provided merely for purposes of brevity and clarity. There are a plurality of ways of representing the collection of criticality information that may be used within the scope of the present invention.

In one embodiment, at the end of the collection of criticality information, a final row indicating the maximum values (or "high-water marks") of each of the information criticality attributes for all information types used in this application system is generated. This final row indicates the calculated information criticality for the entire farm design. The generally accepted practice is for the Information Criticality Matrix for the entire application to be emitted in an early chapter of the security plan, to provide context for the entire document.

For example, if a farm has two servers wherein the high water mark for server 121 is confidentiality-confidential, integrity-medium and availability-low, while the high water mark for server 122 is confidentiality-public, integrity-low and availability-medium. Then, the final row indicating the maximum values for the entire farm would include the highest values in each area based on the highest values reported about the farm. Thus, the resulting high water mark for the farm would be confidentiality-confidential, integrity-medium and availability-medium.

With reference now to 608 of FIG. 6 and to FIG. 1, one embodiment generates the closing text of the document, using the "boilerplate" text stored in the repository. Additionally, a file containing the completed Security Plan draft for this farm design is provided. In one embodiment, the security plan combiner 310 is utilized to generate the completed security report 175.

In one embodiment, the final security document is formatted to include an overview section containing: the name(s) of the system designer, the name(s) of the administrator with access to (and responsibility for) the implemented system, a device summary (e.g., a list of networked devices in that system, a network diagram, which illustrates the connections between devices in an easy-to-understand illustration, and the like.

In one embodiment, for each networked device, such as, but not limited to servers, switches, firewalls, load balancers, in the system design, a detailed description of the device is generated. In one embodiment, the detailed description includes, the device name, the device type, make, and model, the Internet Protocol (IP) address or addresses for the device, the names (and possibly roles) of the individuals who have access to this device, a summary of the network protocols that this device is expected to handle, and the like. In the case where the device is a firewall, the summary lists rules that the firewall applies in restricting network traffic. Additionally, in the case where the device is a computational server, the summary lists the protocols that the server is allowed and expected to process.

In one embodiment, the security report 175 combines the information criticality matrix with an abstract of a security plan, e.g., a "boilerplate", to provide the complete farm security document. In one embodiment, the introductory text of the generated document is provided by using the "boilerplate" text stored in the repository.

For example, the security plan 175 contains a great amount of detail that varies from one system to another, as well as standard sections of "boilerplate" text. In one embodiment, the use of standard boilerplate text sections, intermingled with the details of each device and each type of data handled by the system, all in the appropriate sequence are utilized.

In one embodiment, the content of the boilerplate text is determined by security professionals working from the security policy documents that control policy for the entire organization. In another embodiment, the content of the boilerplate text is determined by in-house regulations, standards, local, state and federal regulations and the like.

The boilerplate text used by the invention consists of sections such as, but not limited to, the following topics. An introductory paragraph citing the importance of technical security controls and referring to the specific security policy document that states that the organization's management requires compliance. A procedural paragraph citing the methodology used to create the Security Plan, and pointers to other documents that contain more information on the methodology. Complete descriptions of the confidentiality labels for data types such as "public", "restricted", "confidential", and "private". Complete descriptions of the labels for other attributes, such as the meaning of "low", "medium", and "high" for an availability attribute, and the meaning of "low", "medium", and "high" for an integrity attribute. An empty table to be filled in later, listing other documents that describe the design, maintenance, and operation of the system described in this plan, and the like.

Thus, the security plan generator 170 extracts details of the application's design, usage, and environment, and then generates a document which is the first draft of the security plan for this application. In one embodiment, a documentation preparation professional will then review the draft, note areas needing further refinement, and then modifies the draft to create the final draft of the security plan. In another embodiment, the draft will be the final draft of the security plan and no further security review is needed.

In summary, embodiments of the present invention provide methods and systems for generating a security document for a farm in a utility computing environment. Embodiments further reduce the high costs of producing compliance documentation. Additionally, embodiment, reduce the possibilities of errors and omissions in prepared documents due to human error. Furthermore, embodiments reduce the requirements for duplication of records, thus decreasing the likelihood of inconsistent records. For example, since all security documents are now stored in a single repository 165, there is no need for a security manager to have a second repository that may not be updated. Embodiments described herein also reduce the poor integration of security documentation processes between solution designers and security documentation preparation professionals.

Embodiments of the present invention are thus described. While the present invention has been described in particular embodiments, it should be appreciated that the present invention should not be construed as limited by such embodiments, but rather construed according to the following claims.

I claim:

1. A method for generating a security document for a farm in a utility computing environment, said method comprising:
   accessing a farm specification in a utility computing environment (UCE) repository;
   accessing information in said UCE repository related to each device described in said farm specification;
   collecting information criticality types and attributes from said UCE repository for each said device described in said farm specification; and
   combining said collected information criticality types and attributes with an abstract of a security plan to provide a complete farm security document.

2. The method of claim 1 wherein said abstract of said security plan comprises:
   providing an inventory of devices for said farm;
   providing a network map for said devices; and
   providing a list of individuals responsible for said farm.

3. The method of claim 1 wherein collecting information criticality types and attributes for each said device in said farm comprises:
   generating an information criticality matrix for said farm, said information criticality matrix comprising information criticality types and attributes for each said device in said farm.

4. The method of claim 1 wherein collecting information criticality types and attributes for each said device in said farm comprises:
   iterating through each said device in said farm to produce a security plan portion for each said device in said farm.

5. The method of claim 4 wherein said iterating through each said device comprises:
   generating text of a description and general attributes of said device;
   initializing a table for reporting an information type available to said device;
   providing a table row for each said information type available to said device;
   generating a definition of information available to said device;
   emitting a high water mark of attribute values; and
   providing said definition of said information available to said device and said high water mark of attribute values as text to said report of said security plan portion for each said device in said farm.

6. The method of claim 5 wherein said collecting information criticality types and attributes for each said device in said farm comprises:
   utilizing an information type and their attributes saved from said tables for each said device.

7. The method of claim 5 wherein said table for reporting further comprises:
   information criticality attributes of each said information type available to said device.

8. The method of claim 5 wherein providing a table row for each said information type available further comprises:
   iterating through each said information type available to said device.

9. The method of claim 8 wherein said iterating further comprises:
   extracting information criticality attributes from the UCE repository for the information type on said device;
   providing said information type and each of the information criticality attributes in said device's report table; and
   noting whether any values of said attributes define a new said high water mark for said device.

10. The method of claim 9 wherein said information type of said device is selected from the information group consisting of: confidentiality, integrity and availability.

11. A security plan generator comprising:
   a repository extractor for extracting a farm specification from a repository;
   a security plan abstract generator for generating an abstract of a security plan for said farm;
   a farm device iterater for iterating through each device in said farm to generate a security plan section for each said device;
   an information criticality generator for generating an information criticality types and attributes collection for said farm; and
   a security plan generator for combining said information criticality types and attributes with said abstract of said security plan for said farm to provide a complete farm security document.

12. The security plan generator of claim 11 wherein said abstract of a security plan for said farm comprises:
   an inventory of devices for said farm;
   a network map for said devices; and
   a list of individuals responsible for said farm.

13. The security plan generator of claim 11 wherein farm device iterator comprises:
   a text generator for generating text of a description and general attributes of said device;
   a table generator for generating a table for reporting an information type available to said device;
   a device iterator for iterating each said information type available to said device and providing said iterating to said table;
   a high water mark provider for providing a high water mark of attribute values for said device to said table; and
   a device section report generator for generating a device report based on said table.

14. The security plan generator of claim 13 wherein device iterator comprises:
   an information criticality attributes extractor for extracting information criticality attributes from the repository for the information type on said device;

a device criticality attributor for providing said information type and each of the information criticality attributes in said device's report table; and a high water mark evaluator for evaluating whether any values of said attributes define a new said high water mark for said device.

15. The security plan generator of claim 14 wherein said information criticality attributes of said device is selected from the information group consisting of: confidentiality, integrity and availability.

16. A computer-usable medium having computer-readable program code embodied therein for causing a method for generating a security document for a farm in a utility computing environment, said method comprising:

accessing a farm specification in a utility computing environment (UCE) repository;

accessing information related to each device in said farm;

iterating through each said device in said farm to produce a security plan section for each said device in said farm;

collecting an information criticality types and attributes for said entire farm;

combining said information criticality types and attributes with an abstract of a security plan to provide a completed security document; and generating a report of said completed security document.

17. The computer-usable medium of claim 16 wherein said abstract of said security plan comprises:

providing an inventory of devices for said farm;

providing a network map for said devices; and providing a list of individuals responsible for said farm.

18. The computer-usable medium of claim 16 wherein said iterating through each said device comprises:

generating text of a description and general attributes of said device;

initializing a table for reporting an information type available to said device;

providing a table row for each said information type available to said device;

iterating through each said information type available to said device;

generating a definition of information available to said device;

emitting a high water mark of attribute values; and providing said definition of said information available to said device and said high water mark of attribute values as text to said report of said completed security document.

19. The computer-usable medium of claim 18 wherein said collecting said information criticality types and attributes comprises:

utilizing an information type and their attributes saved from said tables for each said device.

20. The computer-usable medium of claim 18 wherein said table for reporting further comprises:

providing information criticality attributes of each said information type available to said device.

21. The computer-usable medium of claim 18 wherein said iterating further comprises:

extracting information criticality attributes from the UCE repository for the information type on said device;

providing said information type and each of the information criticality attributes in said device's report table; and noting whether any values of said attributes define a new said high water mark for said device.

22. The computer-usable medium of claim 21 wherein said information criticality attributes of said device is selected from the information group consisting of: confidentiality, integrity and availability.

* * * * *

UNITED STATES PATENT AND TRADEMARK OFFICE
CERTIFICATE OF CORRECTION

PATENT NO. : 7,624,425 B1  Page 1 of 1
APPLICATION NO. : 11/262431
DATED : November 24, 2009
INVENTOR(S) : David Andrew Graves It is certified that error appears in the above-identified patent and that said Letters Patent is hereby corrected as shown below:

In column 14, line 35, in Claim 11, delete "iterater" and insert -- iterator --, therefor.

Signed and Sealed this

Sixteenth Day of February, 2010

David J. Kappos
*Director of the United States Patent and Trademark Office*